(12) United States Patent
Hucker

(10) Patent No.: US 10,808,445 B2
(45) Date of Patent: Oct. 20, 2020

(54) BRAKING DEVICE FOR A MOVING DOOR LEAF AND CORRESPONDING DOOR CLOSER

(71) Applicant: GEZE GmbH, Leonberg (DE)

(72) Inventor: Matthias Hucker, Marxzell (DE)

(73) Assignee: Geze GmbH, Leonberg (DE)

(*) Notice: Subject to any disclaimer, the term of this patent is extended or adjusted under 35 U.S.C. 154(b) by 288 days.

(21) Appl. No.: 16/077,708

(22) PCT Filed: Feb. 1, 2017

(86) PCT No.: PCT/EP2017/052127
§ 371 (c)(1),
(2) Date: Aug. 13, 2018

(87) PCT Pub. No.: WO2017/140498
PCT Pub. Date: Aug. 24, 2017

(65) Prior Publication Data
US 2019/0071915 A1 Mar. 7, 2019

(30) Foreign Application Priority Data
Feb. 15, 2016 (DE) .......................... 10 2016 202 225

(51) Int. Cl.
*E05F 15/63* (2015.01)
*E05F 5/02* (2006.01)
(Continued)

(52) U.S. Cl.
CPC .............. *E05F 15/63* (2015.01); *E05F 5/027* (2013.01); *E05F 2015/631* (2015.01);
(Continued)

(58) Field of Classification Search
CPC ..... E05F 15/63; E05F 5/027; E05F 2015/631; E05F 1/08; E05F 1/16; E05F 1/10;
(Continued)

(56) References Cited

U.S. PATENT DOCUMENTS 5,386,885 A * 2/1995 Bunzl ...................... E05F 1/105
16/49
8,225,458 B1 * 7/2012 Hoffberg ................. E05F 3/222
16/49
(Continued)

FOREIGN PATENT DOCUMENTS

DE 4231984 A1 3/1994
DE 19726021 A1 12/1998
(Continued)

OTHER PUBLICATIONS

Office Action issued in connection with German Patent Application No. 10 2016 202 225.3 dated Oct. 2, 2019.
(Continued)

*Primary Examiner* — Antony M Paul
(74) *Attorney, Agent, or Firm* — Steven M. Shape; Dennemeyer & Associates, LLC

(57) ABSTRACT

The invention relates to a braking device (20) for a moving door leaf (5) comprising a generator (22), the at least one generator shaft (24) of which can be rotated via a movement of the door leaf (5), and at the connection terminals of which a movement-dependent first output voltage occurs, which is applied to an evaluation and control electronics system (10) having an evaluation and control unit and a braking circuit. The braking circuit generates an effective braking force for damping the movement of the door leaf (5), wherein the braking circuit (18) has at least one switch element, via which the connection terminals can be short-circuited, as well as a door closer (1) having a braking device of this type. According to the invention, a second output voltage of the generator (22) is applied to a charging circuit (12), which stores electrical energy for supplying the evaluation and control electronics system (10) with power.

14 Claims, 3 Drawing Sheets

(51) Int. Cl.
*H02P 3/14* (2006.01)
*H02P 3/22* (2006.01)

(52) U.S. Cl.
CPC ..... *E05Y 2201/21* (2013.01); *E05Y 2400/302* (2013.01); *E05Y 2400/41* (2013.01); *H02P 3/14* (2013.01); *H02P 3/22* (2013.01)

(58) Field of Classification Search
CPC ......... E05F 1/1008; E05F 1/004; E05F 1/008; E05F 3/00; E05F 3/02; E05F 3/18; E05F 5/00; H02P 3/14; H02P 3/12; H02P 3/22; H02P 6/00; H02P 6/005; H02P 6/006; H02P 6/008; H02P 6/04; H02P 6/06; H02P 6/08; H02P 6/181; H02P 6/182; H02P 6/24; H02P 8/00; H02P 8/22; H02P 21/0007; H02P 27/00; H02P 27/08; H02P 1/04; H02P 1/18; H02P 1/24; H02P 1/26; H02P 1/46; H02P 1/465; H02P 3/16; H02P 3/18; H02P 21/05; E05Y 2400/41; E05Y 2400/302; G05B 5/01

USPC .......... 318/400.01, 700, 701, 721, 299, 362, 318/376, 515, 516, 528, 554, 555, 266, 318/466, 800, 801, 611
See application file for complete search history.

(56) References Cited

U.S. PATENT DOCUMENTS 9,501,047 B2 * 11/2016 Salutzki .................. E05F 15/63
9,995,076 B1 * 6/2018 Hoffberg .................. E05F 3/10

FOREIGN PATENT DOCUMENTS

| DE | 10 2005 044 341 A1 | 4/2006 |
| DE | 10 2011 055 491 A1 | 5/2013 |
| DE | 102011055491 A1 | 5/2013 |
| DE | 10 2015 200 284 B3 | 10/2015 |
| DE | 10 2015 200 289 A1 | 7/2016 |

OTHER PUBLICATIONS

International Search Report issued in connection with the PCT Application No. PCT/EP2017/052127 dated Apr. 11, 2017.

\* cited by examiner

BRAKING DEVICE FOR A MOVING DOOR LEAF AND CORRESPONDING DOOR CLOSER

CROSS-REFERENCE TO RELATED APPLICATIONS

This is a 35 U.S.C. 371 National Stage Patent Application of International Application No. PCT/EP/052127, filed Feb. 1, 2017, which claims priority to German application 10 2016 202 225.3, filed Feb. 15, 2016, each of which is hereby incorporated by reference in its entirety.

The invention relates to a braking device for a movable door leaf of the type specified in the preamble of patent claim 1 and to a corresponding door closer of the type specified in the preamble of patent claim 12.

Door closers for movable door leaves comprising a mechanical energy storage device and a braking device are known from the prior art and are common. When a door leaf is opened manually, the mechanical energy storage device is loaded with potential energy, which closes the door leaf again when released. The mechanical energy storage device is designed, for example, as a spring, which is tensioned by manually opening the door leaf. The potential energy in the spring subsequently closes the door leaf. The closing moment of the door leaf is determined by the current spring tension and the various transmission ratios in the system. The closing speed itself is dampened in the braking device, for example, by oil in a damper. The desired closing behaviour of the door leaf can be adjusted by means of various hydraulic valves and their setting. This allows for cost-effective and self-sufficient implementation of the door closer, i.e. the door closer operates without an external energy supply. However, the closing speed of the door leaf with valves is only adjustable within limits. For example, the final snap function thus always has the same point of onset because only the passage is adjustable and not the position of the valve. Furthermore, the implementation of functions that depend on the current speed of the door leaf is complex. In addition, adjusting the closing speed, for example, to a desired closing time of the door leaf, is difficult to implement. The valves can only be adjusted through trial and error. If the temperature of the damper oil or the friction conditions in the door closer change, the closing time thus also changes. In addition, escaping damper oil can lead to pollution of the environment if the door closer develops a leak, and the damper oil has to be disposed of. Furthermore, damper oil is usually flammable, so could help fire spread if it leaks during a fire and catches alight.

DE 10 2005 028 007 B4 discloses a drive for actuating a movable door leaf having a braking device of the type in question. The braking device, by means of which movement of the door leaf can be braked, comprises an electric motor operated as a generator, the motor shaft of which can be rotated by a movement of the door leaf and on the motor terminals of which a movement-dependent motor voltage is produced, which is applied to a braking circuit, wherein the braking circuit comprises at least one switch element designed as a field-effect transistor (FET), via which the motor terminals can be short-circuited. A drain-source path of the field-effect transistor is arranged in the braking circuit and a voltage between the gate and source of the field-effect transistor is adjusted via a potentiometer, which is arranged in parallel with the drain-source path of the field-effect transistor. A voltage tap of the potentiometer is connected to the gate terminal of the field-effect transistor. The field-effect transistor is thus operated as a voltage-dependent load resistor for the electric motor in such a manner that the braking force of the braking device is dependent on the output voltage of the electric motor which is operated as a generator.

The aim of the invention is to provide a braking device for a movable door leaf and a corresponding door closer which enable improved adjustment of the closing speed of the door leaf and autonomous implementation of the door closer.

This aim is achieved by the features of the braking device for a movable door leaf according to patent claim 1 and by the features of the door closer according to patent claim 12.

Advantageous embodiments and further developments of the invention are disclosed in the remaining claims.

The braking device according to the invention for a movable door leaf comprises a generator, the at least one generator shaft of which can be rotated by a movement of the door leaf and on the connection terminals of which a movement-dependent first output voltage is produced, which is applied to an electronic evaluation and control system having an evaluation and control unit and a braking circuit, which generates an effective braking force for damping the movement of the door leaf. Here, the braking circuit has at least one switch element, by means of which the connection terminals can be short-circuited. According to the invention, a second output voltage of the generator is applied to a charging circuit, which stores electrical energy for powering the electronic evaluation and control system.

The invention also relates to a door closer comprising a mechanical energy storage device, which is operatively connected to a door leaf via a force transmission device, can be loaded with potential energy by manually opening the door leaf and closes the released door leaf, and comprising a braking device according to the invention, which dampens the movement of the door leaf.

The generator coupled to the door leaf advantageously enables the generation of electrical energy from available mechanical energy so that the braking device or door closer can operate autonomously without external energy. Embodiments of the braking device according to the invention can be installed as a damping element in a door closer so that the door closer can be operated autonomously, i.e. without external energy (mains connection, battery, etc.). In such a door closer, some of the potential energy stored in a mechanical energy storage device for closing the door leaf is used to power the electronic assemblies, which produces the effective braking force via a braking circuit in order to dampen the movement of the door leaf. When the door leaf is opened, some of the "manually" introduced energy can likewise be used to power these electronic assemblies.

In an advantageous embodiment of the braking device according to the invention, the generator can be designed as an electric motor having at least two windings. In this case, at least one first winding can generate the first output voltage and at least one second winding can generate the second output voltage. This means that the at least one second winding operates as a generator and generates the electrical energy for the electronic assemblies, and that the at least one first winding is used to generate the effective braking force for damping the door leaf. The electric motor can be designed, for example, as a brush motor having two windings and two commutators or as a brushless DC motor having two windings. In addition, the at least two windings of the electric motor can act on a common generator shaft, which is operatively connected to an output shaft of a mechanical energy storage device via a transmission.

Alternatively, the generator can have two electric motors. In this case, a first electric motor can generate the first output voltage and a second electric motor can generate the second output voltage. This means that the first electric motor is used to generate the effective braking force for damping the door leaf, and the second electric motor operates as a generator and generates the electrical energy for the electronic assemblies. The first electric motor can be designed, for example, as a brush motor, and the second electric motor can be designed, for example, as a brushless DC motor. In addition, the two electric motors can each be operatively connected to an output shaft of a mechanical energy storage device via a generator shaft and an associated transmission. This variant offers the advantages that an optimised transmission design is possible for operating the generator. The electronic evaluation and control system can calculate the axle speed directly from the generator voltage. As a result, the damping of the door leaf movement can be controlled at least for simple door closers without an additional speed sensor.

In a further advantageous embodiment of the braking device according to the invention, the evaluation and control unit can carry out a pulse width modulation of the motor current interacting with the first output voltage via the switch element and adjust an effective braking force for damping the movement of the door leaf.

The pulse width modulation of the motor current advantageously allows a closing time to be specified, which can be kept constant, for example, by regulating the closing speed as a function of the opening angle of the door leaf. The desired closing time can advantageously be predetermined and set independently of temperature, aging and friction. In addition, embodiments of the braking device according to the invention allow further configurable and electronically adjustable functions to be implemented, such as, for example, a final snap function, which can specify varying points of onset for the final snap and the end speed of the vehicle wing as a function of certain parameters. Furthermore, an opening damping function can be implemented which dampens the opening speed of the door leaf from a specific opening angle. Furthermore, additional functions such as cycle counters and the storage of maintenance data can be easily implemented. In addition, the braking device according to the invention has no highly flammable substances such as damper oil.

In a preferred embodiment of the braking device according to the invention for a movable door leaf, the evaluation and control unit can adjust the damping of the movement of the door leaf according to a current movement direction and/or a current speed and/or a current opening angle of the door leaf. The evaluation and control unit can determine a current movement direction and speed of the door leaf from the motor voltage, for example, via at least one measuring circuit. In this case, the polarity of the motor voltage can provide information about the movement direction of the door leaf, and the magnitude of the motor voltage can provide information for determining the speed of the door leaf.

In an advantageous embodiment of the braking device according to the invention, the evaluation and control unit can dampen the opening movement of the door leaf by means of the pulse width modulation of the motor current when the current speed of the opening movement exceeds a predetermined speed threshold value. Additionally or alternatively, the evaluation and control unit can dampen the opening movement of the door leaf by means of the pulse width modulation of the motor current when the current opening angle of the door leaf exceeds a predetermined opening angle threshold value. Furthermore, the evaluation and control unit can control the damping of the closing movement of the door leaf by means of the pulse width modulation of the motor current according to the current speed and/or the current opening angle of the door leaf in such a way that a predetermined closing time can be achieved. In addition, the evaluation and control unit can end the damping of the closing movement of the door leaf when the door leaf has reached at least one predetermined final snap condition. For example, a final snap speed and/or a final snap position can be specified as the final snap condition.

In a further advantageous embodiment of the braking device according to the invention, the charging circuit can have a capacitor, which stores the generated electrical energy for powering the braking device.

In an advantageous embodiment of the door closer according to the invention, the mechanical energy storage device can act on an output shaft, which can be coupled to the door leaf via a sliding arm. The output shaft of the mechanical energy storage device can be coupled to at least one generator shaft of the generator of the braking device via at least one transmission.

Exemplary embodiments of the invention are explained in more detail below with reference to drawings.

The figures show the following:

Figure 1:
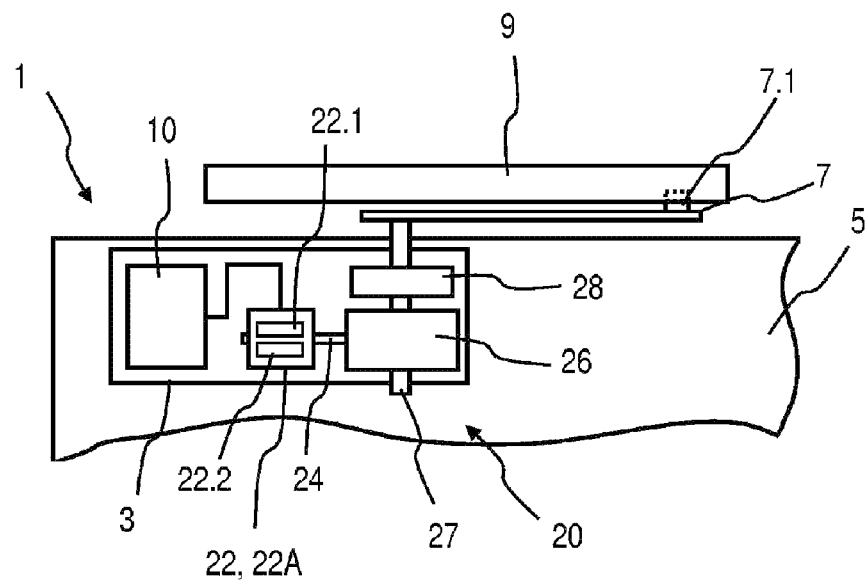
FIG. 1 shows a schematic representation of a section of a door leaf by means of a first exemplary embodiment of a door closer according to the invention having a braking device according to the invention.
Figure 2:
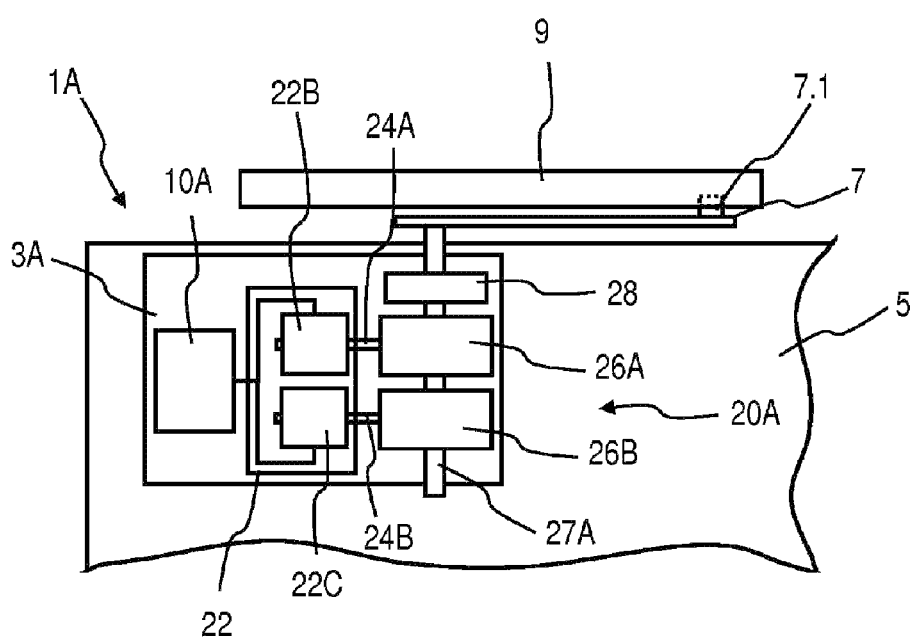
FIG. 2 shows a schematic representation of a section of a door leaf on the basis of a second exemplary embodiment of a door closer according to the invention having a braking device according to the invention.

As can be seen from FIGS. 1 and 2, a door closer 1, 1A in the exemplary embodiments shown has a housing 3, 3A in each case in which a mechanical energy storage device 28 and a braking device 20, 20A are arranged. The mechanical energy storage device 28 is preferably designed as a spring and is operatively connected to a door leaf 5 via a force transmission device. The mechanical energy storage device 28 is loaded with potential energy by manually opening the door leaf 5 and closes the released door leaf 5 again. The braking device 20, 20A dampens the movement of the door leaf 5 and comprises a generator 22, the at least one generator shaft 24, 24A, 24B of which can be rotated by means of a movement of the door leaf 5 and on the connection terminals K1, K2 of which a movement-dependent first output voltage $U_{A1}$ is produced, which is applied to an electronic evaluation and control system unit 10 having an evaluation and control unit 16 and a braking circuit 14, which generates an effective braking force for damping the movement of the door leaf 5. The braking circuit 14 has at least one switch element FET, via which the connection terminals K1, K2 can be short-circuited. According to the invention, a second output voltage $U_{A2}$ of the generator 22 is applied to a charging circuit 12, which stores electrical energy for powering the electronic evaluation and control system 10.

As can be further seen from FIGS. 1 and 2, the housing 3, 3A in the exemplary embodiments shown is mounted such that it is fixed to the leaf on the upper left edge region of the movable door leaf 5. The mechanical energy storage device 28 acts on an output shaft 27, 27A, which is coupled to the door leaf 5 via a sliding arm 7. The sliding arm 7 features, at its free end, a sliding block 7.1 which is guided in a sliding rail 9 mounted fixedly with respect to the panel. In addition, the output shaft 27, 27A of the mechanical energy storage device 28 is coupled via at least one transmission 26, 26A, 26B to at least one generator shaft 24, 24A, 24B of the generator 22 of the braking device 20, 20A.

During opening and closing of the door leaf 5, the at least one generator shaft 24, 24A, 24B of the generator 22 is rotated by means of the at least one transmission 26, 26A, 26B. The mechanical energy storage device 28 designed as a spring can be tensioned or relaxed, although does not have to be. In the case of cantilever systems, the spring 28 can, for example, be held in the tensioned position (door open), but the at least one generator shaft 24, 24A, 24B is still rotated when the door leaf 5 is moved. When the at least one generator shaft 24, 24A, 24B is rotated, the first output voltage $U_{A1}$ is on the connection terminals K1, K2 and the second output voltage $U_{A2}$ is on the charging circuit 12, said output voltages being dependent in each case on the angular velocity of the corresponding generator shaft 24, 24A, 24B.

As can be further seen from FIG. 1, in the first exemplary embodiment shown, the generator 22 is designed as an electric motor 22A having at least two windings 22.1, 22.2. In the exemplary embodiment shown, a first winding 22.1 generates the first output voltage $U_{A1}$, and a second winding 22.2 generates the second output voltage $U_{A2}$. In the exemplary embodiment shown, the electric motor 22A operated as a generator 22 is in the form of a brushless DC motor having two windings 22.1, 22.2, which act on a common generator shaft 24. The common generator shaft 24 is operatively connected to the output shaft 27 of the mechanical energy storage device 28 via a transmission 26. In an alternative exemplary embodiment shown, the electric motor 22A is designed as a brush motor having two windings 22.1, 22.2 and two commutators.

As can also be seen from FIG. 2, the generator 22 in the second exemplary embodiment shown has two electric motors 22B, 22C. Here, a first electric motor 22B generates the first output voltage $U_{A1}$, and a second electric motor 22C generates the second output voltage $U_{A2}$. The first electric motor 22B is in the form of a brush motor and the second electric motor 22C is in the form of a brushless DC motor. In the second exemplary embodiment shown, the two electric motors 22B, 22C are each operatively connected to the output shaft 27A of the mechanical energy storage device 28 via a generator shaft 24A, 24B and an associated transmission 26A, 26B. This advantageously enables an optimised configuration of the transmission 26B, which is coupled to the generator shaft 24B of the second electric motor 22C, for operating the generator.

Figure 3:
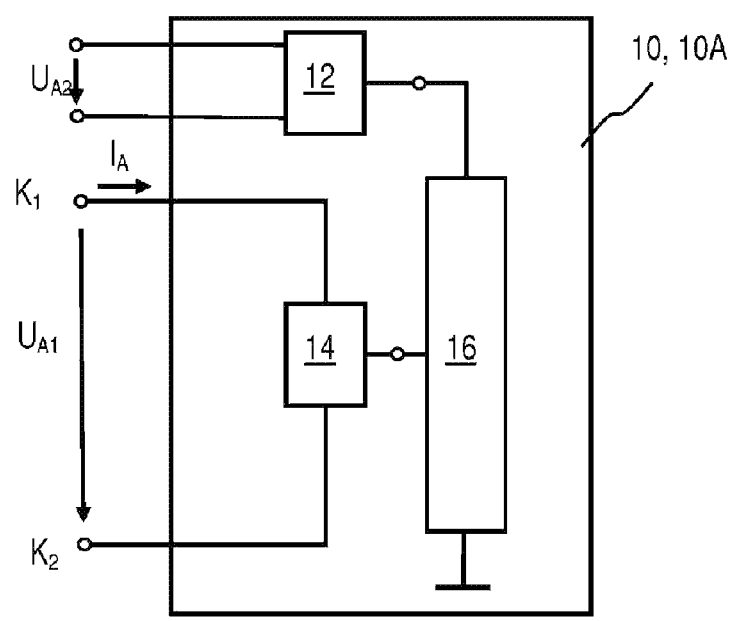
FIG. 3 shows a schematic block diagram of an electronic evaluation and control system of the braking device according to the invention from FIG. 1 or 2.

As can further be seen from FIG. 3, the electronic evaluation and control system 10, 10A comprises an evaluation and control unit 16, which is preferably designed as a microcontroller, a charging circuit 12, to which the second output voltage $U_{A2}$ is applied, and a braking circuit 14, to which the first output voltage $U_{A1}$ is applied.

Figure 4:
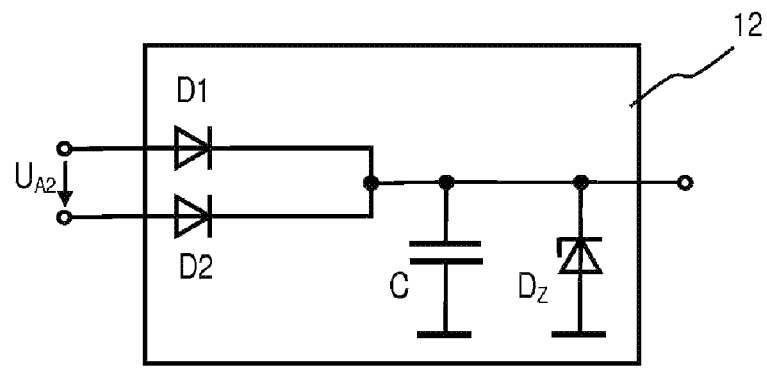
FIG. 4 shows a schematic circuit diagram of an exemplary embodiment of a charging circuit of the electronic evaluation and control system from FIG. 3.

As can be further seen from FIG. 4, the charging circuit 12 has a capacitor C, which stores the generated electrical energy for powering the braking device 20, 20A. According to the polarity of the second output voltage $U_{A2}$, the latter is applied via a first diode D1 or via a second diode D1 to the storage capacitor C. A Zener diode $D_Z$ limits the maximum voltage.

Figure 5:
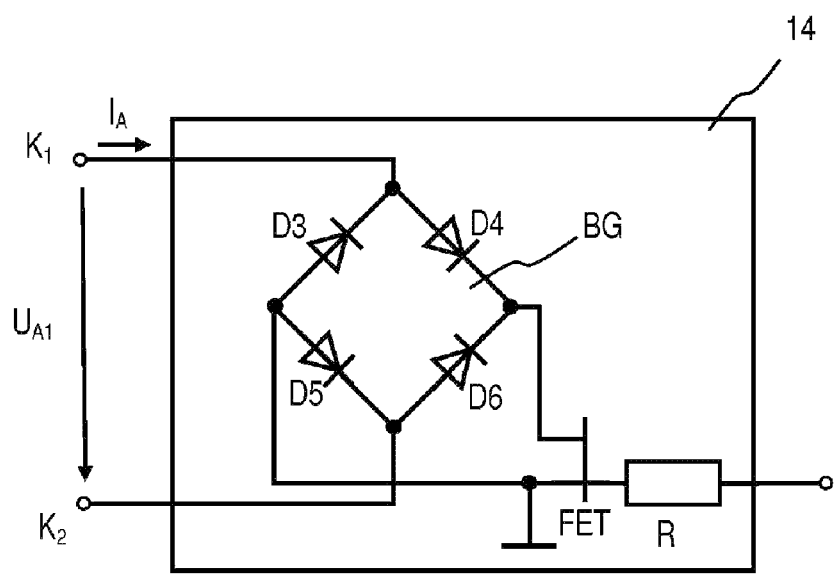
FIG. 5 shows a schematic circuit diagram of an exemplary embodiment of a braking circuit of the electronic evaluation and control system from FIG. 3.

As can further be seen from FIG. 5, the braking circuit 14 comprises a field-effect transistor as a switch element FET, a gate resistor R, via which the gate of the field-effect transistor FET is electrically connected to the evaluation and control unit 16, and a bridge rectifier circuit BG having four diodes D3, D4, D5, D6, which has the effect that the polarity of the voltage on the drain-source path of the field-effect transistor FET remains the same irrespective of the polarity of the first output voltage $U_{A1}$ of the generator 22.

Via the field-effect transistor FET, the evaluation and control unit 16 now carries out a pulse width modulation of the motor current $I_A$ interacting with the first output voltage $U_{A1}$ and sets an effective braking force for damping the movement of the door leaf 5. This means that the evaluation and control unit 16 for damping the movement of the door leaf 5 short-circuits the connection terminals K1, K2 via the field-effect transistor FET. During the short circuit, the angular velocity of the at least one generator shaft 24, 24A, 24B is dampened. By means of the pulse width modulation of the short-circuit current or motor current $I_A$, the evaluation and control unit 16 adjusts the damping of the speed and thus the braking force.

Preferably, the evaluation and control unit 16 adjusts the damping of the movement of the door leaf 5 according to a current movement direction and/or a current speed and/or a current opening angle of the door leaf 5. The evaluation and control unit 16 determines a current movement direction and speed of the door leaf 5 from the second output voltage $U_{A2}$ via at least one measuring circuit (not shown in greater detail).

This means that the evaluation and control unit 16 adjusts the damping of the movement of the door leaf 5 according to a current movement direction and/or a current speed and/or a current opening angle of the door leaf 5. The evaluation and control unit 16 can thus dampen the opening movement of the door leaf 5 by means of the pulse width modulation of the motor current $I_A$ when the current speed of the opening movement exceeds a predetermined speed threshold value.

In addition, the evaluation and control unit 16 can adjust the point of onset of the final snap and the final speed to the desired values. This means that the evaluation and control unit 16 ends the damping of the closing movement of the door leaf 5 when the door leaf 5 has reached at least one predetermined final snap condition. For example, a final snap speed and/or a final snap position can be specified as the final snap condition.

The evaluation and control unit 16 dampens the opening speed of the door leaf 5 from a specific opening angle. This means that the evaluation and control unit 16 can dampen the opening movement of the door leaf 5 by means of the pulse width modulation of the motor current $I_A$ when the current opening angle of the door leaf 5 exceeds a predetermined opening angle threshold value.

LIST OF REFERENCE SYMBOLS 1, 1A Door closer
3, 3A Housing
5 Door leaf
7 Sliding arm
7.1 Sliding block
9 Sliding rail
10, 10A Electronic evaluation and control system 12 Charging circuit (power supply)
14 Braking circuit (pulse width modulation)
16 Evaluation and control unit (microcontroller)
20 Braking device
22 Generator
22A Electric motor
22.1, 22.2 Winding
22B, 22C Electric motor
24, 24A, 24B Generator shaft
26, 26A, 26B Transmission
27, 27A Output shaft
28 Mechanical energy storage device
D1 to D6 Diode
R Ohmic resistor
C Electrical energy storage device
$D_Z$ Zener diode
FET Field-effect transistor
BG Bridge rectifier
K1, K2 Motor terminal
$U_{A1}$ First output voltage
$U_{A2}$ Second output voltage
$I_A$ Motor current

The invention claimed is:
1. A braking device (20, 20A) for a movable door leaf (5) comprising a generator (22), at least one generator shaft (24, 24A, 24B) of which is rotatable by a movement of the door leaf (5) and on the connection terminals (K1, K2) of which a movement-dependent first output voltage ($U_{A1}$) is produced, which is applied to an electronic evaluation and control system (10) having an evaluation and control unit (16) and a braking circuit (14), which generates an effective braking force for damping the movement of the door leaf (5), wherein the braking circuit (14) has at least one switch element (FET), via which the connection terminals (K1, K2) can be short-circuited,
wherein
a second output voltage ($U_{A2}$) of the generator 22 is applied to a charging circuit 12, which stores electrical energy for powering the electronic evaluation and control system (10).
2. The braking device according to claim 1,
wherein
the generator (22) is designed as an electric motor (22A) having at least two windings (22.1, 22.2), wherein at least one first winding (22.1) generates the first output voltage ($U_{A1}$) and at least one second winding (22.2) generates the second output voltage ($U_{A2}$).
3. The braking device according to claim 2,
wherein
the electric motor (22A) is designed as a brush motor having two windings (22.1, 22.2) and two commutators or as a brushless DC motor having two windings (22.1, 22.2).
4. The braking device according to claim 2,
wherein
the at least two windings (22.1, 22.2) of the electric motor (22A) act on a common generator shaft (24), which is operatively connected to an output shaft (27) of a mechanical energy storage device (28) via a transmission (26).

5. The braking device according to claim 1,
wherein
the generator (22) has two electric motors (22B, 22C), wherein a first electric motor (22B) produces the first output voltage ($U_{A1}$) and a second electric motor (22C) generates the second output voltage ($U_{A2}$).
6. The braking device according to claim 5,
wherein
the first electric motor (22B) is designed as a brush motor and the second electric motor (22C) is designed as a brushless DC motor.
7. The braking device according to claim 5
wherein
the two electric motors (22B, 22C) are each operatively connected to an output shaft (27A) of a mechanical energy storage device (28) via a generator shaft (24A, 24B) and an associated transmission (26A, 26B).
8. The braking device according to claim 1
wherein
the evaluation and control unit (16) via the switch element (FET) carries out a pulse width modulation of the motor current ($I_A$) interacting with the first output voltage ($U_{A1}$) and adjusts an effective braking force for damping the movement of the door leaf (5).
9. The braking device according to claim 8,
wherein
the evaluation and control unit (16) adjusts the damping of the movement of the door leaf (5) according to a current movement direction and/or a current speed and/or a current opening angle of the door leaf (5).
10. The braking device according to claim 9,
wherein
the evaluation and control unit (16) determines a current movement direction and speed of the door leaf (5) from the second output voltage ($U_{A2}$) via at least one measuring circuit.
11. The braking device according to claim 1
wherein
the charging circuit (12) has a capacitor (C) which stores the generated electrical energy for powering the braking device (20).
12. A door closer (1, 1A) comprising a mechanical energy storage device (28), which is operatively connected to a door leaf (5) via a force transmission device and can be loaded with potential energy by manually opening the door leaf (5) and closes the released door leaf (5), and comprising a braking device (20, 20A), which dampens the movement of the door leaf (5),
wherein
the braking device (20, 20A) is designed according to claim 1.
13. The door closer according to claim 12,
wherein
the mechanical energy storage device (28) acts on an output shaft (27, 27A) which is coupled to the door leaf (5) via a sliding arm (7).
14. The door closer according to claim 13,
wherein
the output shaft (27, 27A) of the mechanical energy storage device (28) is coupled via at least one transmission (26, 26A, 26B) to at least one generator shaft (24, 24A, 24B) of the generator (22) of the braking device (20, 20A).

* * * * *